US010061486B2

(12) United States Patent
Kaehler et al.

(10) Patent No.: US 10,061,486 B2
(45) Date of Patent: Aug. 28, 2018

(54) AREA MONITORING SYSTEM IMPLEMENTING A VIRTUAL ENVIRONMENT

(71) Applicants: Adrian Kaehler, Los Angeles, CA (US); Matt Stine, Los Angeles, CA (US); Dan Selnick, Burbank, CA (US)

(72) Inventors: Adrian Kaehler, Los Angeles, CA (US); Matt Stine, Los Angeles, CA (US); Dan Selnick, Burbank, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 717 days.

(21) Appl. No.: 14/533,867

(22) Filed: Nov. 5, 2014

(65) Prior Publication Data

US 2016/0127690 A1    May 5, 2016

(51) Int. Cl.
*G06F 3/00* (2006.01)
*G06F 3/0484* (2013.01)
*G06T 19/00* (2011.01)
*G06K 9/00* (2006.01)
*G06F 3/0481* (2013.01)

(52) U.S. Cl.
CPC ...... *G06F 3/04842* (2013.01); *G06F 3/04815* (2013.01); *G06F 3/04817* (2013.01); *G06K 9/00771* (2013.01); *G06T 19/003* (2013.01); *G06T 19/006* (2013.01)

(58) Field of Classification Search
CPC .......... G06F 3/04815; G06F 3/04817; G06K 19/003; G06K 9/00771

USPC ........................................................ 348/143
See application file for complete search history.

(56) References Cited

U.S. PATENT DOCUMENTS

| | | | |
|---|---|---|---|
| 6,980,690 B1 * | 12/2005 | Taylor | G06F 3/04845 345/419 |
| 7,583,275 B2 | 9/2009 | Neumann et al. | |
| 2007/0238981 A1 * | 10/2007 | Zhu | A61B 90/36 600/424 |
| 2008/0291279 A1 * | 11/2008 | Samarasekera | G08B 13/19693 348/159 |
| 2012/0240077 A1 * | 9/2012 | Vaittinen | G06F 3/04815 715/781 |
| 2012/0303481 A1 * | 11/2012 | LouisN'jai | G06Q 30/06 705/26.8 |

(Continued)

*Primary Examiner* — Jeffery Williams
(74) *Attorney, Agent, or Firm* — Tarolli, Sundheim, Covell & Tummino LLP (57) ABSTRACT

An area monitoring system includes a camera to monitor a region of interest and provide real-time video data corresponding to real-time video images of the region of interest. A memory stores data associated with a rendered virtual environment associated with a geographic region that includes the region of interest. An image processor combines the real-time video data and the data associated with the virtual environment to generate image data. A user interface enables a user to navigate the virtual environment via inputs and displays the image data based on a location perspective corresponding to a viewing perspective of the user at a given virtual location within the virtual environment. The image processor superimposes the video images of the region of interest onto the virtual environment in the image data at a location and an orientation associated with the location perspective of the user within the virtual environment.

17 Claims, 7 Drawing Sheets

(56) References Cited

U.S. PATENT DOCUMENTS

| | | | |
|---|---|---|---|
| 2013/0091432 A1* | 4/2013 | Shet | G08B 13/19645 |
| | | | 715/719 |
| 2014/0184475 A1* | 7/2014 | Tantos | H03M 13/356 |
| | | | 345/8 |
| 2014/0368621 A1* | 12/2014 | Michiyama | H04N 5/23216 |
| | | | 348/50 |

* cited by examiner

AREA MONITORING SYSTEM IMPLEMENTING A VIRTUAL ENVIRONMENT

TECHNICAL FIELD

This disclosure relates generally to monitoring systems, and more specifically to an area monitoring system implementing a virtual environment.

BACKGROUND

In modern society and throughout recorded history, there has always been a demand for surveillance, security, and monitoring measures. Such measures have been used to prevent theft or accidental dangers, unauthorized access to sensitive materials and areas, and in a variety of other applications. Typical modern monitoring systems implement cameras to view a region of interest, such as based on a real-time (e.g., live) video feed that can provide visual information to a user at a separate location. As an example, multiple cameras can be implemented in a monitoring, security, or surveillance system that can each provide video information to the user from respective separate locations. For a large region with which the monitoring system is to provide video information, a very large number of video feeds that each provide video information of different locations can be cumbersome and/or confusing to a single user.

SUMMARY

One example includes an area monitoring system. The system includes a camera to monitor a region of interest and provide real-time video data corresponding to real-time video images of the region of interest. A memory stores data associated with a rendered three-dimensional virtual environment associated with a geographic region that includes the region of interest. An image processor combines the real-time video data and the data associated with the three-dimensional virtual environment to generate image data. A user interface enables a user to navigate the three-dimensional virtual environment via inputs and displays the image data based on a location perspective corresponding to a viewing perspective of the user at a given virtual location within the three-dimensional virtual environment. The image processor superimposes the video images of the region of interest onto the three-dimensional virtual environment in the image data at a location and an orientation based on the location perspective of the user within the three-dimensional virtual environment.

Another embodiment includes a non-transitory computer readable medium comprising instructions that, when executed, are configured to implement a method for monitoring a geographic region. The method includes receiving real-time video data corresponding to real-time video images of a region of interest within the geographic region via a plurality of cameras. The method also includes accessing data associated with a rendered three-dimensional virtual environment that is associated with the geographic region that includes at least the region of interest from a memory. The method also includes receiving navigation inputs provided via a user interface, the navigation inputs corresponding to virtual movement of a user within the rendered three-dimensional virtual environment and to a location perspective corresponding to a viewing perspective of a user at a given virtual location within the rendered three-dimensional virtual environment. The method further includes superimposing the real-time video images of the region of interest associated with at least one of the plurality of cameras in the location perspective of the user onto the rendered three-dimensional virtual environment in the image data at a location and an orientation based on the location perspective of the user within the rendered three-dimensional virtual environment.

Another embodiment includes an area monitoring system. The system includes at least one camera configured to monitor a region of interest and to provide real-time video data corresponding to real-time video images of the region of interest. The system also includes a memory configured to store data associated with a rendered three-dimensional virtual environment that is associated with a geographic region that includes at least the region of interest. The system also includes an image processor configured to combine the real-time video data and the data associated with the rendered three-dimensional virtual environment to generate image data. The system also includes a video controller configured to receive the real-time video data and to provide the real-time video data to the image processor in response to a request for the real-time video data by the image processor based on a location perspective corresponding to a viewing perspective of the user at a given virtual location within the rendered three-dimensional virtual environment. The system further includes a user interface configured to enable a user to navigate the rendered three-dimensional virtual environment via inputs and to display the image data based on the location perspective. The image processor can be configured to superimpose the real-time video images of the region of interest onto the rendered three-dimensional virtual environment in the image data at a location and an orientation based on the location perspective of the user within the rendered three-dimensional virtual environment and at a resolution that varies based on at least one of a distance and a viewing perspective angle of the user with respect to a location of the real-time video images superimposed in the rendered three-dimensional virtual environment relative to the location perspective of the user.

DETAILED DESCRIPTION

This disclosure relates generally to monitoring systems, and more specifically to an area monitoring system implementing a virtual environment. The area monitoring system includes at least one camera that is configured to monitor a region of interest and to provide real-time video data corresponding to real-time video images of the region of interest. The region of interest can correspond to any portion of the geographic region that the area monitoring system is configured to monitor, such as the interior and/or exterior of a building, a facility, a park, a city block, an airport, or any other geographic region of interest for which monitoring is desired. For example, multiple cameras can be located at disparate locations and/or orientations for monitoring different portions of the geographic region, such that there can be multiple separate regions of interest, each associated with a given one camera.

The area monitoring system also includes a memory configured to store data associated with a rendered three-dimensional virtual environment that is associated with the geographic region that includes at least the region of interest. The rendered three-dimensional virtual environment (hereinafter "virtual environment") can be a preprogrammed graphical representation of the actual geographic region, having been rendered from any of a variety of graphical software tools to represent the physical features of the geographic region, such that the virtual environment can correspond approximately to the geographic region in relative dimensions and contours. The area monitoring system can also include an image processor that is configured to combine the real-time video data and the data associated with the virtual environment to generate image data.

Additionally, the area monitoring system can include a user interface that allows a user to interact with the area monitoring system. The user interface can be configured to enable a user to navigate the virtual environment via inputs. The user interface can include a display that is configured to display the image data at a location perspective corresponding to a viewing perspective of the user at a given virtual location within the rendered three-dimensional virtual environment. Thus, the displayed image data presents the location perspective as a virtual location of the user in the virtual environment at a viewing perspective corresponding to the virtual location and viewing orientation of the user in the virtual environment. Additionally, the image processor can be further configured to superimpose the real-time video images of the region of interest onto the virtual environment in the image data at an orientation associated with the location perspective of the user within the rendered three-dimensional virtual environment. As a result, the user can view the real-time video images provided via the camera(s) based on the location perspective of the user in the virtual environment relative to the viewing perspective of the camera.

Furthermore, the user interface can allow the user to navigate the virtual environment in a variety of different views. As one example, the user interface can enable the user to view the image data in an overhead view associated with the location perspective of the user being an overhead perspective with respect to the virtual environment. As another example, the user interface can enable the user to view the image data in a camera-perspective view associated with the location perspective being substantially similar to a perspective of a respective one of the at least one camera superimposed on the virtual environment. As yet another example, the user interface can enable the user to view the image data in a dynamic object-centric view associated with the location perspective of the user being offset from and substantially centered upon a dynamic object that is graphically displayed as a dynamic object icon with respect to the virtual environment via the image processor in response to location information associated with the dynamic object. The user can interact with icons that have been superimposed on the virtual environment, such as camera icons corresponding to a virtual location of the cameras in the virtual environment and/or dynamic object icons corresponding to the dynamic objects, such as to toggle between the different views.

Figure 1:
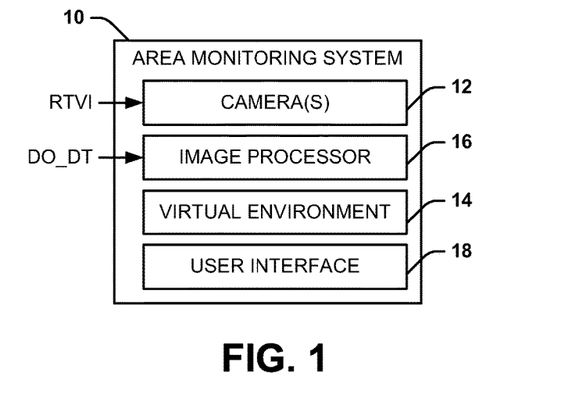
FIG. 1 illustrates an example of an area monitoring system.

FIG. 1 illustrates an example of an area monitoring system 10. The area monitoring system 10 can be implemented in any of a variety of applications, such as security, surveillance, logistics, of any of a variety of other area monitoring applications. The area monitoring system 10 includes at least one camera 12 that is configured to monitor a region of interest of a geographic region and to provide real-time video data corresponding to real-time video images RTVI of the region of interest. As described herein, the term "geographic region" can describe any region in three-dimensional space that the area monitoring system 10 is configured to monitor, such as the interior and/or exterior of a building, a facility, a park, a city block, an airport, or any other geographic region for which monitoring is desired. Therefore, each of the camera(s) 12 is configured to monitor a portion of the geographic region. For example, the camera(s) 12 can include a plurality of cameras that are located at disparate locations and/or orientations to monitoring different areas of interest of the geographic region, such that there can be multiple areas of interest, each associated with a given one of the camera(s) 12.

In the example of FIG. 1, the area monitoring system 10 also includes a virtual environment 14, such as stored in memory. The virtual environment 14 can correspond to a rendered three-dimensional virtual environment that is associated with substantially the entire geographic region that includes at least the respective region(s) of interest associated with the camera(s) 12. As described herein, the virtual environment 14 describes a preprogrammed rendered three-dimensional graphical representation of the actual geographic region, having been rendered from any of a variety of graphical software tools to represent the substantially static physical features of the geographic region, such that the virtual environment 14 can correspond approximately to the geographic region in relative dimensions and contours. For example, the virtual environment 14 can include buildings, roads, walls, doors, hallways, rooms, hills, and/or a variety of other substantially non-moving features of the geographic region. The virtual environment 14 can be updated in response to physical changes to the static features of the geographic region, such as based on construction of or demolition of a structure. Thus, the virtual environment 14 can be maintained in a substantially current state of the geographic region.

The area monitoring system 10 can also include an image processor 16 that is configured to combine the real-time video data that is provided via the camera(s) 12 with the virtual environment 14 to generate image data. A user can interact with the image data via a user interface 18. As described herein, the term "image data" corresponds to a composite image that can be displayed to a user via the user interface 18, with the composite image comprising a portion of the real-time video data and the virtual environment 14. As an example, the user interface 18 can be configured to enable a user to navigate through the virtual environment 14 via inputs, such that the user can simulate movement through the virtual environment 14. For example, the user interface 18 can include a display that is configured to display the image data at a location perspective corresponding to a viewing perspective of the user at a given virtual location within the virtual environment 14. As described herein, the term "location perspective" is defined as a viewing perspective of the user at a given virtual location and with a given viewing orientation within the virtual environment 14, such that the display of the user interface 18 simulates that which a user can see in the virtual environment 14 from the given virtual location within the virtual environment 14 based on the virtual location and based on an orientation of the user with respect to the virtual location. Therefore, at a given virtual location in the virtual environment 14, the user can change a viewing orientation to "see" in 360° in both azimuth and polar angles in a spherical coordinate system from a given virtual location in the virtual environment 14.

Therefore, the displayed image data provided to the user via the user interface 18 demonstrates the location perspective of the user in the virtual environment 14. Based on the combination of the real-time video data that is provided via the camera(s) 12 with the virtual environment 14, the image processor 16 can be further configured to superimpose the real-time video images RTVI of the region of interest from the camera(s) 12 onto the virtual environment 14 in the image data at an orientation associated with the location perspective of the user within the virtual environment 14. As a result, the user can view the real-time video images RTVI provided via the camera(s) 12 based on the location perspective of the user in the virtual environment relative to the viewing perspective of the camera(s) 12. As described herein, the viewing perspective of the camera corresponds to the images that are captured by the camera via the associated lens, as perceived by the user. Accordingly, the user can see the real-time video images RTVI provided via the camera(s) 12 in a manner that simulates the manner that the user would see the real-time images RTVI as perceived from the actual location in the actual geographic region corresponding to the virtual location in the virtual environment 14.

Additionally, the image processor 16 can be configured to receive dynamic object inputs, demonstrated in the example of FIG. 1 as a signal DO_DT, that correspond to dynamic objects that interact with the actual geographic region, such that the image processor 16 can superimpose the dynamic objects on the virtual environment 14 as icons. As described herein, the term "dynamic object" corresponds to moving and/or interactive objects, people, and/or devices in the geographic region that are not or cannot be preprogrammed in the virtual environment 14. For example, the dynamic objects can include people, animals, vehicles, moving machines, draw bridges, or any of a variety of objects that can move or change state within the geographic region. Therefore, the dynamic object inputs DO_DT can include location information for the respective dynamic objects (e.g., global positioning satellite (GPS) location inputs), identification information (e.g., name and/or identification number/code), status information (e.g., an operational state, active/deactive status, etc.). The dynamic objects can be superimposed onto the virtual environment 14 by the image processor 16 at a virtual location that corresponds to an approximate location in the geographic region based on the location information associated with the dynamic object inputs DO_DT. In addition, because the image processor 16 superimposes the real-time video images RTVI into the virtual environment 14, the user can see the actual dynamic objects in the real-time video images RTVI, as perceived by the respective camera(s) 12, in the image data via the user interface 18 upon the dynamic objects being in a respective region of interest. As a result, the user can see the real-time video images RTVI provided via the camera(s) 12 in a manner that simulates the manner that the user would see the real-time images RTVI as perceived from the actual location in the actual geographic region corresponding to the virtual location in the virtual environment 14. Furthermore, the user interface 18 can be configured to allow the user to navigate through the virtual environment 14 in a variety of different ways to view the real-time video images RTVI in the virtual environment 14. In the separate views, the user can implement the user interface 18 to move, zoom, and/or change viewing orientation via graphical or hardware controls to change the location perspective in the virtual environment 14.

As one example, the user interface 18 can include an overhead view, such that the user's location perspective is an overhead view of the virtual environment. As a second example, the user interface 18 can include a camera-perspective view associated with the location perspective being substantially similar to a perspective of a respective one of the camera(s) 12 superimposed on the virtual environment 14. As an example, the user can select a given one of the camera(s) 12 that is superimposed as an icon on the virtual environment 14, such as from the overhead view, to view the real-time video images RTVI of the perspective of the respective one of the camera(s) 12. As a third example, the user interface 18 can include a dynamic object-centric view associated with the location perspective of the user being offset from and substantially centered upon a dynamic object icon. For example, the user can select a given dynamic object that is superimposed as an icon on the virtual environment 14, such as from the overhead view, to provide the dynamic object-centric view in which the location perspective is offset from and substantially centered upon the dynamic object icon at a given distance and orientation (e.g., azimuth and polar angles in a spherical coordinate system) in the virtual environment 14. Other examples of navigating through the virtual environment 14 are possible, such as to select from predetermined location perspectives and/or in a virtual flight-mode to provide the location perspective to the user from any virtual location in three-dimensional space in the virtual environment 14.

Figure 2:
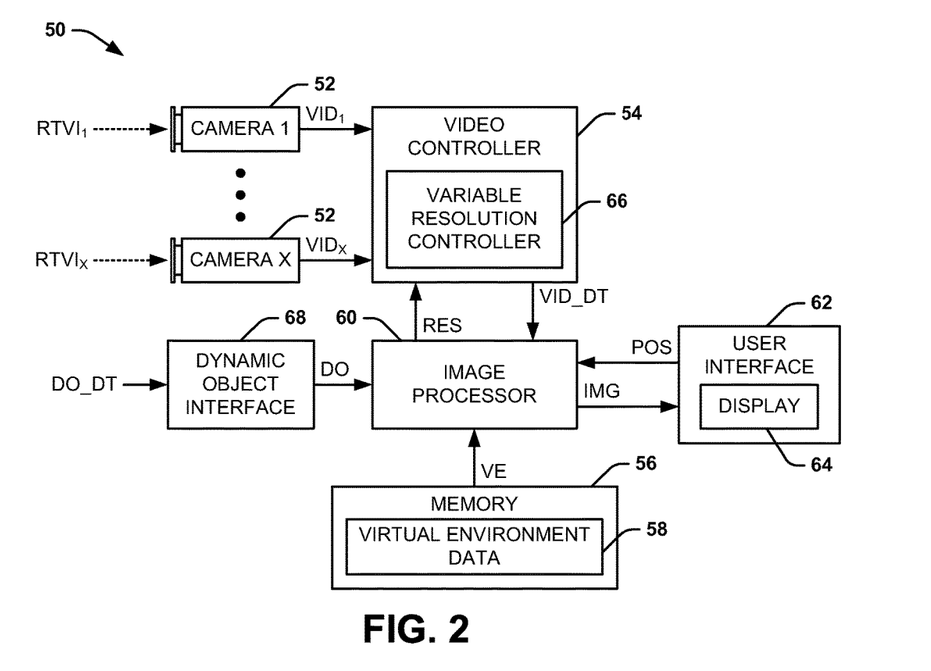
FIG. 2 illustrates another example of an area monitoring system.

FIG. 2 illustrates another example of an area monitoring system 50. The area monitoring system 50 can correspond to the area monitoring system 10 in the example of FIG. 1, such as can be implemented in security, surveillance, logistics, of any of a variety of other area monitoring applications.

In the example of FIG. 2, the area monitoring system 50 includes a plurality X of cameras 52, where X is a positive integer. The cameras 52 are each configured to monitor a region of interest of a geographic region and to provide respective real-time video data streams $VID_1$ through $VID_X$ corresponding to real-time video images $RTVI_1$ through $RTVI_X$ of the region of interest. Therefore, each of the cameras 52 is configured to monitor a portion of the geographic region. The portions of the geographic region can be distinct or can overlap a portion of the geographic region corresponding to a different one of the cameras 52. For example, the cameras 52 can be located at disparate locations and/or orientations to monitoring different areas of interest of the geographic region. The real-time video data streams $VID_1$ through $VID_X$ are provided to a video controller 54 that is configured to process the real-time video data streams $VID_1$ through $VID_X$.

The area monitoring system 50 also includes a memory 56 that is configured to store virtual environment data 58 corresponding to a virtual environment. Similar to as described previously in the example of FIG. 1, the virtual environment data 58 can correspond to a rendered three-dimensional virtual environment that is associated with substantially the entire geographic region that includes the respective regions of interest associated with the cameras 52. Therefore, the virtual environment data 58 can be a preprogrammed graphical representation of the actual geographic region, having been rendered from any of a variety of graphical software tools to represent the physical features of the geographic region, such that the virtual environment can correspond approximately to the geographic region in relative dimensions and contours. The virtual environment data 58 can be maintained in a substantially current state of the geographic region, and can be periodically updated or updated in response to a change in the geographic region. As described herein, the terms "virtual environment" and "virtual environment data" can be used interchangeably.

The area monitoring system 50 can also include an image processor 60 that is configured to combine the processed real-time video data, demonstrated in the example of FIG. 2 as a signal VID_DT, with the virtual environment data 58, demonstrated in the example of FIG. 2 as a signal VE, to generate image data IMG that is provided to a user interface 62 and with which a user can interact. As an example, the user interface 62 can be configured to enable a user to navigate through the virtual environment 58 via inputs, such that the user can simulate movement through the virtual environment 58. The user interface 62 can thus provide an input POS to the image processor 60 that defines the location perspective of the user based on the simulated movement of the user in the virtual environment 58. In example of FIG. 2, the user interface 62 includes a display 64 that is configured to display the image data IMG at the location perspective of the user within the virtual environment 58, such as updated by the image processor 60 via the image data IMG. Therefore, inputs POS provided by the user via the user interface 62 can be responsive to the location perspective displayed by the display 64, and the image processor 60 can update the image data IMG based on the inputs POS that cause a change to the location perspective of the user in the virtual environment 58.

Similar to as described previously, the displayed image data IMG provided to the user via the display 64 demonstrates the location perspective of the user in the virtual environment 58. Therefore, the display 64 can simulate that which a user can see in the virtual environment 58 from the given virtual location within the virtual environment 58 based on the virtual location and based on an orientation of the user with respect to the virtual location. The image processor 60 can thus superimpose the real-time video images $RTVI_1$ through $RTVI_X$ of the respective regions of interest from the cameras 52 onto the virtual environment 58 in the image data IMG at respective orientations associated with the location perspective of the user within the virtual environment 58. As a result, the user can view the real-time video images $RTVI_1$ through $RTVI_X$ provided via the respective cameras 52 based on the location perspective of the user in the virtual environment relative to the viewing perspective of the cameras 52. Accordingly, the user can see the real-time video images RTVI provided via the camera(s) 52 in a manner that simulates the manner that the user would see the real-time images RTVI as perceived from the actual location in the actual geographic region corresponding to the virtual location in the virtual environment 58. For example, the RTVI can be provided by the image processor such that the RTVI can be centered on a normal axis that passes through a perceived plane of the RTVI (e.g., such that the normal axis is orthogonal with respect to the perceived plane of the RTVI), with the axis corresponding to a central axis of the lens of the respective camera 52. Additionally, the RTVI can be provided at a location in the virtual environment 58 that can correspond to a distance associated with the field of view and/or the resolution of the respective camera 52.

Based on the location perspective of the user in the virtual environment 58, the image processor 60 provides a request, demonstrated in the example of FIG. 2 as a signal RES, to the video controller 54 for only the relevant real-time video streams $VID_1$ through $VID_X$ that can be perceived by the user at the respective location perspective of the user in the virtual environment 58. As a result, the processed video real-time video data VID_DT can include only the requested real-time video data streams $VID_1$ through $VID_X$ that can be perceived by the user at the respective location perspective, with the remaining real-time video streams $VID_1$ through $VID_X$ being either stored in the memory 56 (e.g., for subsequent access) or discarded.

In addition, the video controller 54 includes a variable resolution controller 66. For example, the request RES can indicate a request for a given resolution of the requested real-time video streams $VID_1$ through $VID_X$. For example, the superimposition of a given one of the real-time video data streams $VID_1$ through $VID_X$ on the virtual environment 58 can be very proximal or very distant based on the location perspective of the user in the virtual environment 58. Therefore, the variable resolution controller 66 can be configured to provide the processed real-time video data VID_DT at a resolution that corresponds to the relative virtual proximity of the location perspective of the user in the virtual environment 58 and the respective one of the real-time video data streams $VID_1$ through $VID_X$ superimposed onto the virtual environment 58.

As an example, a first real-time video data stream $VID_1$ superimposed onto the virtual environment 58 that is far away from the location perspective of the user is going to be provided to the image processor 60 at a lower resolution relative to a second real-time video data stream $VID_2$ superimposed onto the virtual environment 58 very close to the location perspective of the user. As another example, a real-time video data stream VID that is superimposed onto the virtual environment 58 at an orientation angle that is offset from the normal axis (e.g., that passes orthogonally through a center of the RTVI) relative to the location perspective, and thus appears tilted in the virtual environment 58 as perceived by the user on the display 64, is provided to the image processor 60 (e.g., via the processed real-time video data VID_DT) at a lower resolution than if it was superimposed at an orientation that is more normal with respect to the location perspective of the user. Therefore, by providing only the relevant real-time video streams $VID_1$ through $VID_X$ to the image processor 60, and by providing the real-time video streams $VID_1$ through $VID_X$ at a lower resolution for more distant and/or off-angle real-time video streams $VID_1$ through $VID_X$ as superimposed on the virtual environment 58, the image processor 60 can operate with much greater processing efficiency by displaying the real-time video streams $VID_1$ through $VID_X$ at only a necessary presence and/or resolution to the user via the display 64.

The area monitoring system 50 also includes a dynamic object interface component 68 that receives dynamic object inputs DO_DT corresponding to one or more dynamic objects that interact with the geographic region. The dynamic object interface component 68 can be configured to process the dynamic object inputs DO_DT to provide information about the dynamic objects to the image processor 60, demonstrated in the example of FIG. 2 as a signal DO. For example, the dynamic object inputs DO_DT can include location information for the respective dynamic objects (e.g., global positioning satellite (GPS) location inputs), identification information (e.g., name and/or identification number/code), status information (e.g., an operational state, active/deactive status, etc.). The signal DO can therefore include the pertinent information regarding the dynamic object, which can include the location information and a tag comprising descriptive information associated with the respective dynamic object. Therefore, the image processor 60 can be configured to superimpose an icon and/or an associated tag corresponding to the dynamic objects onto the virtual environment 58 at a virtual location that corresponds to an approximate location in the geographic region based on the location information and the descriptive information based on the signal DO. In addition, because the image processor 60 superimposes the real-time video images $RTVI_1$ through $RTVI_X$ into the virtual environment 58, the user can see the actual dynamic objects in the real-time video images $RTVI_1$ through $RTVI_X$, as perceived by the respective cameras 52, in the image data IMG via the display 64 upon the dynamic objects being in the respective regions of interest.

As described previously, the user interface 62 can be configured to allow the user to navigate through the virtual environment 58 in a variety of different ways to interact with the virtual environment 58 and to view the real-time video images $RTVI_1$ through $RTVI_X$ in the virtual environment 58. In the separate views, the user can implement the user interface 62 to move, zoom, and/or change viewing orientation via graphical or hardware controls to change the location perspective in the virtual environment 58. Additionally, the user can select different views and/or access information by selecting icons superimposed on the virtual environment 58, such as associated with the cameras 52 and/or the dynamic objects. For example, the icons associated with the cameras 52 and/or the dynamic objects can have virtual locations in the virtual environment 58 that correspond to an approximate three-dimensional location of the respective cameras 52 and/or dynamic objects in the geographic region. Thus, the user can select the icons associated with the respective cameras 52 and/or dynamic objects, such as by clicking/double-clicking on the respective icons on the display 64, to access different views associated with the location perspective and/or to access additional information regarding the dynamic objects.

FIGS. 3-7 demonstrate separate examples of image data with which a user can view via the display 64 and interact via the user interface 62. Therefore, reference is to be made to the example of FIG. 2 in the following description of the examples of FIGS. 3-7. In the examples of FIGS. 3-7, the geographic region corresponds to an airport, such that the virtual environment 58 corresponds to a three-dimensional rendered graphical representation of the airport, including buildings, control towers, runways, and/or tarmac surfaces. However, it is to be understood that a virtual environment 58 can be programmed for any of a variety of geographical regions in accordance with the details described herein. In the following examples of FIGS. 3-7, the graphical features of the virtual environment 58 are demonstrated as faint dotted lines, whereas the graphical features that are superimposed on the virtual environment 58, such as the real-time video images, icons, tags, and location perspective control features, are demonstrated with thicker solid lines.

Figure 3:
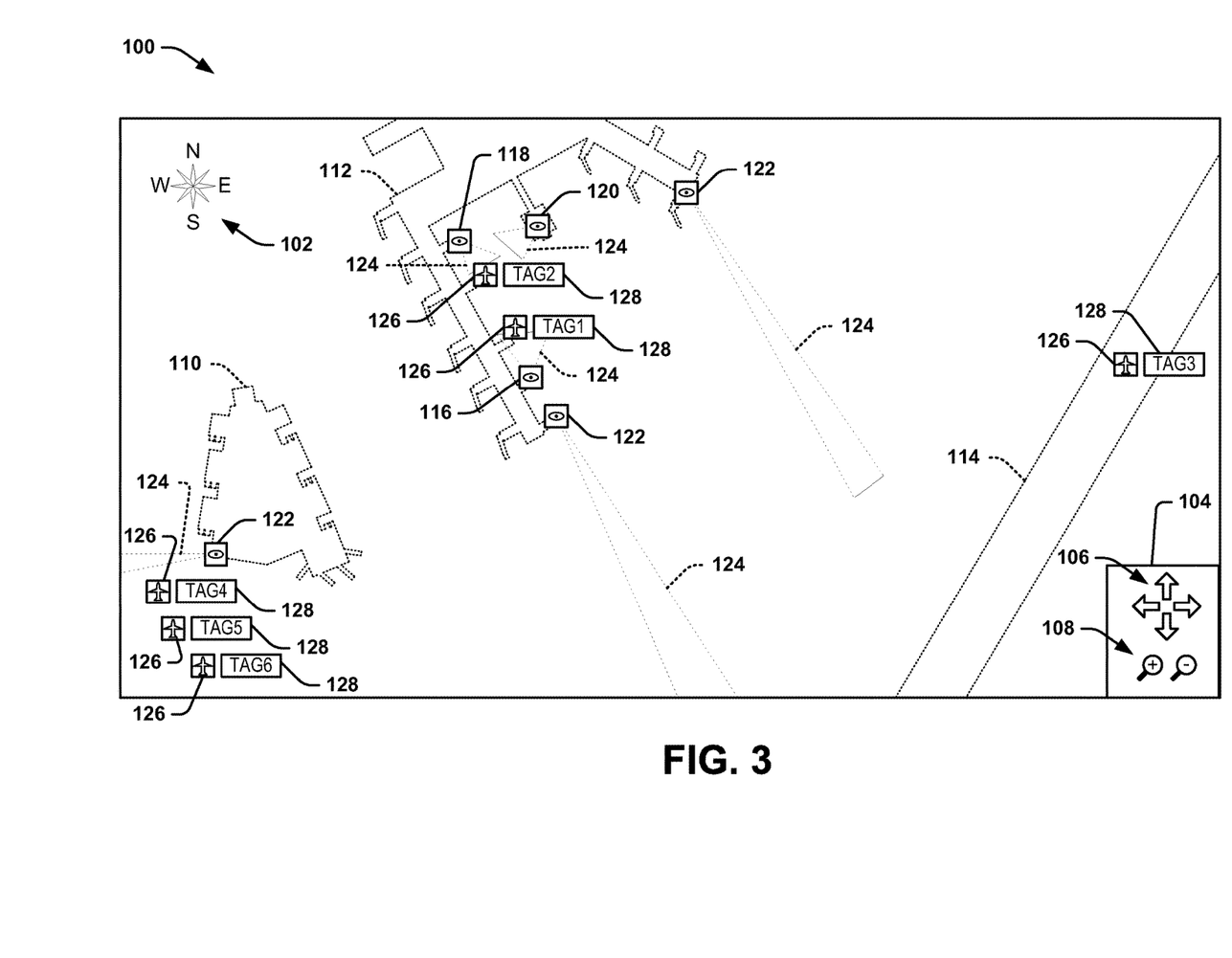
FIG. 3 illustrates a first example of image data.

FIG. 3 illustrates a first example of image data 100. As described previously, the image data 100 can correspond to the image data IMG that is provided to the user interface 62 and which is displayed to the user via the display 64 in the example of FIG. 2. The image data 100 is provided in the example of FIG. 3 as an overhead view of a portion of the virtual environment 58, and thus of a portion of the geographic region (e.g., the airport). The image data 100 includes a compass rose 102 and a set of controls 104 that can assist the user in navigating through the virtual environment 58. The set of controls 104 includes direction arrows 106 to allow the user to pan over the overhead view of the virtual environment 58, such as to explore other portions of the virtual environment 58 corresponding to respective other portions of the geographic region. Additionally, the set of controls 104 also includes zoom controls 108 to zoom in and out in the overhead view, such as to see more or less of the portion of the virtual environment 58, and thus the corresponding portion of the geographic region, in the image data 100 via the display 64.

The virtual environment 58 includes a first building 110, a second building 112, and a runway 114. The image data 100 includes a plurality of camera icons that are demonstrated at virtual locations that can correspond to respective approximate three-dimensional locations in the geographic region, which is demonstrated in the example of FIG. 3 as being attached to the exterior of the first and second buildings 110 and 112. The camera icons include a first camera icon 116, a second camera icon 118, a third camera icon 120, and a plurality of other camera icons 122. In the example of FIG. 3, the camera icons 116, 118, 120, and 122 are demonstrated as square icons having eye symbols therein, but it is to be understood that the camera icons 116, 118, 120, and 122 can be demonstrated in a variety of ways and can include alpha-numeric designations to better distinguish them to the user. Each of the camera icons 116, 118, 120, and 122 includes a respective visual indication 124 of a field of view of the perspective of each of the respective camera icons 116, 118, 120, and 122, wherein the visual indications 124 of the field of view emanate from the respective camera icons 116, 118, 120, and 122 as dashed lines. Therefore, the visual indications 124 of the field of view of the camera icons can provide an indication to the user as to what a given one of the cameras 52 is "seeing" at a given time. Some of the visual indications 124 demonstrate a planar end of the visual indications 124 that connects the bounds of the fields of view, such as to demonstrate a focal plane of the respective one of the cameras 52. As an example, the image processor 60 can move the visual indications 124 in response to movement of the cameras 52 (e.g., left, right, up, down), and can adjust the focal plane based on a given zoom or focus operation of the respective camera.

In addition, the image data 100 includes a plurality of dynamic object icons 126 that are demonstrated at virtual locations that can correspond to respective approximate three-dimensional locations in the geographic region. In the example of FIG. 3, the dynamic object icons 126 can correspond to airplanes located in and/or moving along various portions of the geographic region. As an example, the location of the dynamic object icons 126 on the virtual environment 58 in the image data 100 can be based on the received dynamic object inputs DO_DT (e.g., based on GPS inputs). Therefore, the image controller 60 can be configured to update the virtual location of the dynamic object icons 126 in substantial real-time in response to movement of the dynamic objects in the geographic region. In the example of FIG. 3, each of the dynamic object icons 126 includes a respective tag 128, demonstrated in the example of FIG. 3 as TAG1 through TAG6, that can provide descriptive information associated with the respective dynamic object, such as received from the dynamic object inputs DO_DT. As an example, the tags 128 can provide information such as flight number, time of departure, status, and/or a variety of other information that may be useful to the user. As another example, the user can provide inputs via the user interface 62 to edit the tags 128 and/or to select a tag 128, such as to receive additional information regarding the respective dynamic object.

Figure 4:
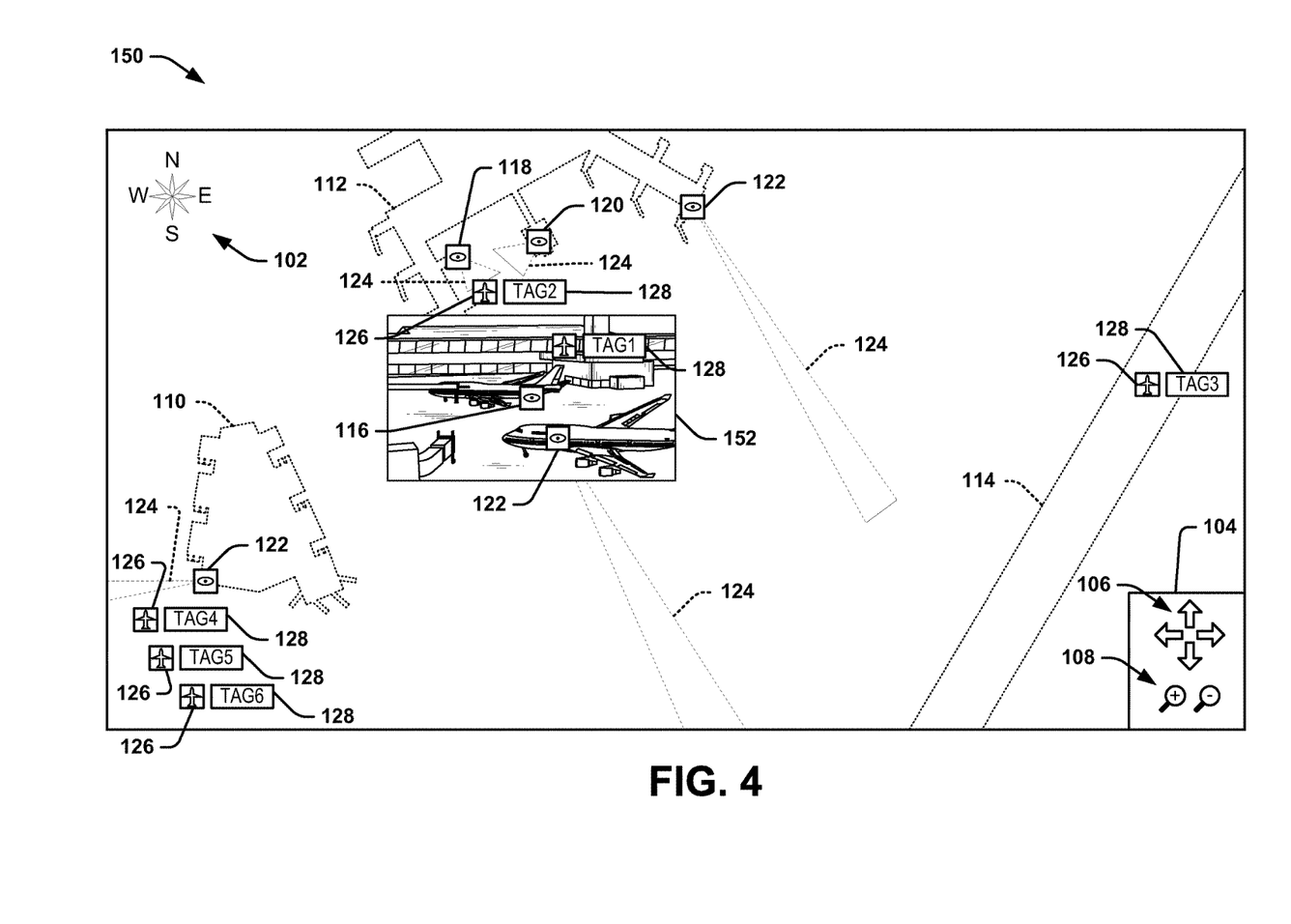
FIG. 4 illustrates a second example of image data.

As described previously, the user interface 62 can be configured to allow the user to navigate through the virtual environment 58 in a variety of different ways to interact with the virtual environment 58 and to interact with the camera icons 116 and the dynamic object icons 126. FIG. 4 illustrates a second example of image data 150. The image data 150 is demonstrated substantially the same as the image data 100 in the example of FIG. 3, and thus the same reference numbers are provided in the example of FIG. 4 as those provided in the example of FIG. 4. However, in response to selection of the camera icon 116 by the user, the image processor 60 can be configured to provide a preview of the perspective of the camera 52 corresponding to the camera icon 116, demonstrated in the example of FIG. 4 as a real-time video image preview 152.

As an example, the real-time video image preview 152 can be provided at a substantially predetermined and/or adjustable size as superimposed onto the virtual environment 58, is demonstrated in the example of FIG. 4 as being substantially centered on the camera 52 corresponding to the camera icon 116. As an example, the user can select the camera icon 116 in a predetermined manner (e.g., a single click) to display the real-time video image preview 152 corresponding to the perspective of the camera 52 associated with the camera icon 116. Because the real-time video image preview 152 is a preview, it can be provided in a substantially smaller view relative to a camera-perspective view (e.g., as demonstrated in the example of FIG. 5), and can disable camera controls (e.g., zoom and/or directional orientation changes). Additionally, because the real-time video image preview 152 is provided as only a preview, other icons are superimposed over the real-time video image preview 152 in the example of FIG. 4.

For example, while the real-time video image preview 152 is displayed in the image data 150, the user can still interact with the camera icon 118 and/or the dynamic object icon 126 with which TAG2 is associated via the user interface 62. Thus, the user can select the camera icon 118 and/or the dynamic object icon 126 with which TAG2 is associated, such as to preview the perspective of the camera 52 corresponding to the camera icon 118 and/or to change views. Furthermore, because the real-time video image preview 152 is demonstrated at a more distant view relative to a camera-perspective view (e.g., as demonstrated in the example of FIG. 5), the variable resolution controller 66 can provide the preview at a lower resolution relative to a camera-perspective view (e.g., as demonstrated in the example of FIG. 5) of the camera 52 associated with the same camera icon (e.g., the camera icon 116).

The real-time video image preview 152 is one example of a manner in which the real-time video images of the cameras 52 can be superimposed onto the virtual environment 58. As described previously, the user can select a camera-perspective view via the user interface 62 corresponding to the location perspective being substantially similar to a perspective of a respective one of the cameras 52 superimposed on the virtual environment 58. As an example, the user can select a given one of the camera icons 116, 118, 120, or 122 (e.g., double-click), such as from the overhead view demonstrated in the image data 100 and 150 in the respective examples of FIGS. 3 and 4, to view the real-time video images VID of the perspective of the respective one of the cameras 52 via the display 64.

Figure 5:
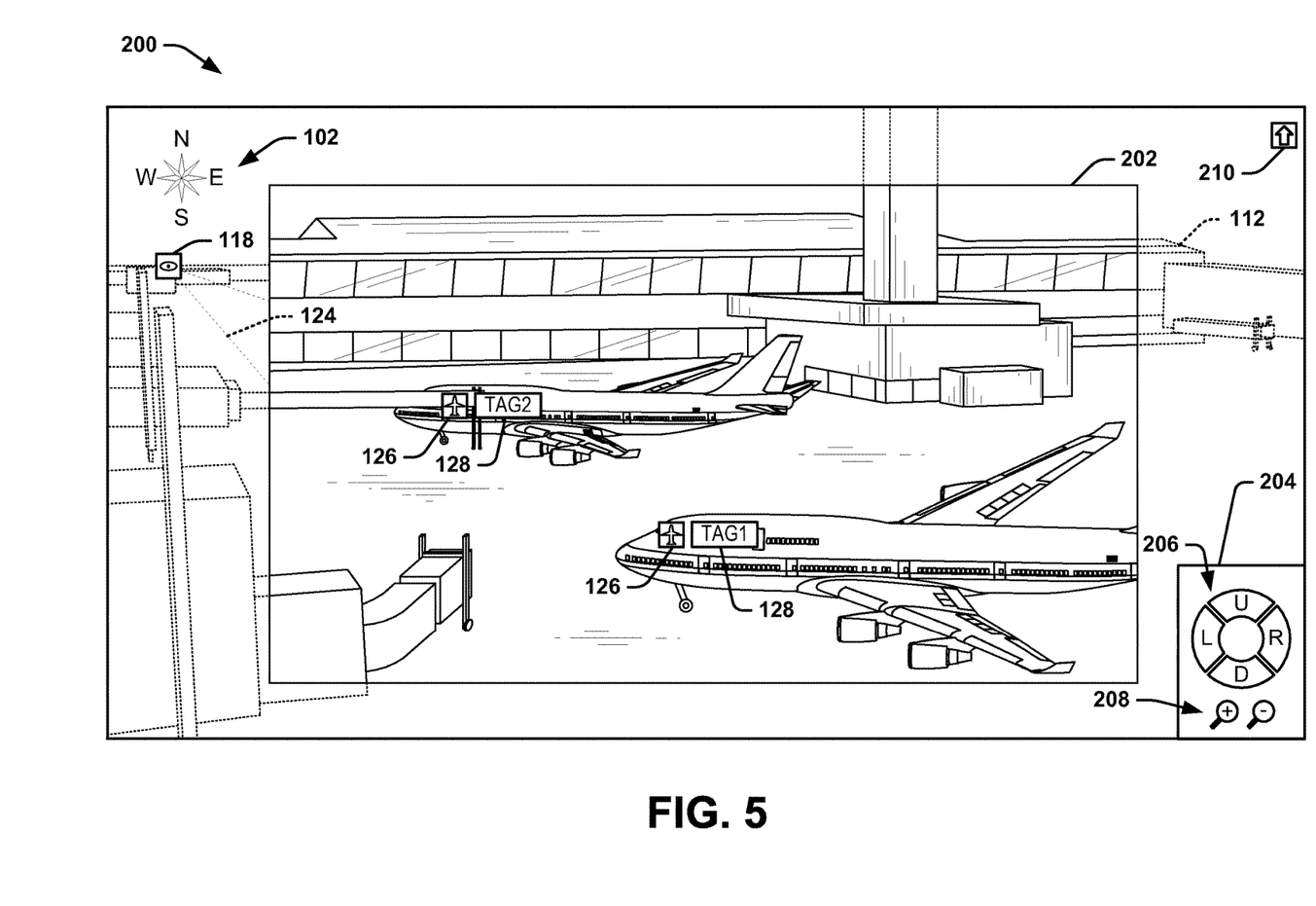
FIG. 5 illustrates a third example of image data.

FIG. 5 illustrates a third example of image data 200. The image data 200 is demonstrated in the camera-perspective view of the camera 52 associated with the camera icon 116 in the examples of FIGS. 3 and 4. For example, the user can select the camera icon 116 in a second manner that is distinct from the manner in which the camera icon 116 is selected for preview (e.g., a double-click versus a single-click) to switch from the overhead view in the image data 100 and 150 in the respective examples of FIGS. 3 and 4 to select the camera-perspective view of the camera 52 associated with the camera icon 116. Therefore, in the example of FIG. 5, the camera-perspective view is demonstrated as a real-time video image 202 that is superimposed over the virtual environment 58 in a manner that the location perspective of the user and the viewing perspective of the respective camera 52 are substantially the same. In the example of FIG. 5, the surrounding virtual environment 58 that extends beyond the field of view of the camera 52 (e.g., as dictated by the respective visual indication 124) is likewise demonstrated in the image data 200, such that the perspective of the respective camera 52 is superimposed on the virtual environment 58 as coterminous in space with the location perspective of the user in the virtual environment 58.

The image data 200 includes a set of controls 204 that are different from the set of controls 104 in the examples of FIGS. 3 and 4, and can thus allow the user to manipulate the image data 200 in a different manner relative to the image data 100 and 150 in the respective examples of FIGS. 3 and 4. For example, the set of controls 204 can correspond to controls for the camera 52 associated with the camera icon 116. In the example of FIG. 5, the set of controls 204 includes yaw and pitch directional controls 206 to allow the user to change the orientation angle of the camera 52 associated with the camera icon 116 in the camera-perspective view. In response to changes in the orientation angle of the camera 52 associated with the camera icon 116 in the camera-perspective view, the surrounding portions of the virtual environment 58 that extends beyond the field of view of the camera 52 (e.g., as dictated by the respective visual indication 124) likewise changes in the image data 200 to maintain the coterminous display of the camera perspective and the location perspective of the user. Additionally, the set of controls 204 also includes zoom controls 208 to zoom the camera 52 associated with the camera icon 116 in and out in the camera-perspective view. Furthermore, the image data 200 includes an icon 210 that the user can select to switch to the overhead view, such as demonstrated in the examples of FIG. 3 or 4.

In the example of FIG. 5, the dynamic object icons 126 associated with the respective dynamic objects are superimposed over the real-time video image 202 in the example of FIG. 5. However, in the camera-perspective view, the dynamic object icons 126 are superimposed over the dynamic objects themselves, demonstrated as the respective commercial-liner airplanes in the example of FIG. 5, such that the user can see the dynamic objects with which the dynamic object icons 126 are associated and can ascertain information regarding the dynamic objects via the respective tags 128. In addition, other dynamic object icons 126 and/or camera icons, demonstrated by the camera icon 118 in the example of FIG. 5, can be superimposed over the real-time video image 202 and/or the virtual environment 58 surrounding the real-time video image 202. Therefore, in the camera-perspective view demonstrated by the image data 200, the user can still interact with the camera icon 118 and/or the dynamic object icons 126 with which TAG1 and TAG2 are associated via the user interface 62. Thus, the user can select the camera icon 118 and/or the dynamic object icons 126 with which TAG1 and TAG2 are associated, such as to change to the camera-perspective view corresponding to the camera 52 associated with the camera icon 118 or to change to a dynamic object-centric view associated with the respective dynamic object icons 126. Furthermore, because the real-time video image 202 is demonstrated at the camera-perspective view, and thus at the full view of the respective camera 52, the variable resolution controller 66 can provide the real-time video image 202 at the highest resolution available.

The real-time video image 202 in the camera-perspective view is yet another example of a manner in which the real-time video images of the cameras 52 can be superimposed onto the virtual environment 58. As described previously, the user can select a given dynamic object icon 126 superimposed the virtual environment 58, such as from the overhead view or the camera-perspective view, to provide the dynamic object-centric view in which the location perspective is offset from and centered upon the dynamic object icon 126 at a given distance and orientation (e.g., azimuth and polar angles in a spherical coordinate system) in the virtual environment 58. As an example, the user can select a given one of the dynamic object icons 126 (e.g., double-click), such as from the overhead view demonstrated in the image data 100 and 150 in the respective examples of FIGS. 3 and 4 or the camera-perspective view demonstrated in the image data 200 in the example of FIG. 5, to view the real-time video images VID from the location perspective that is offset and centered upon the dynamic object icon via the display 64.

Figure 6:
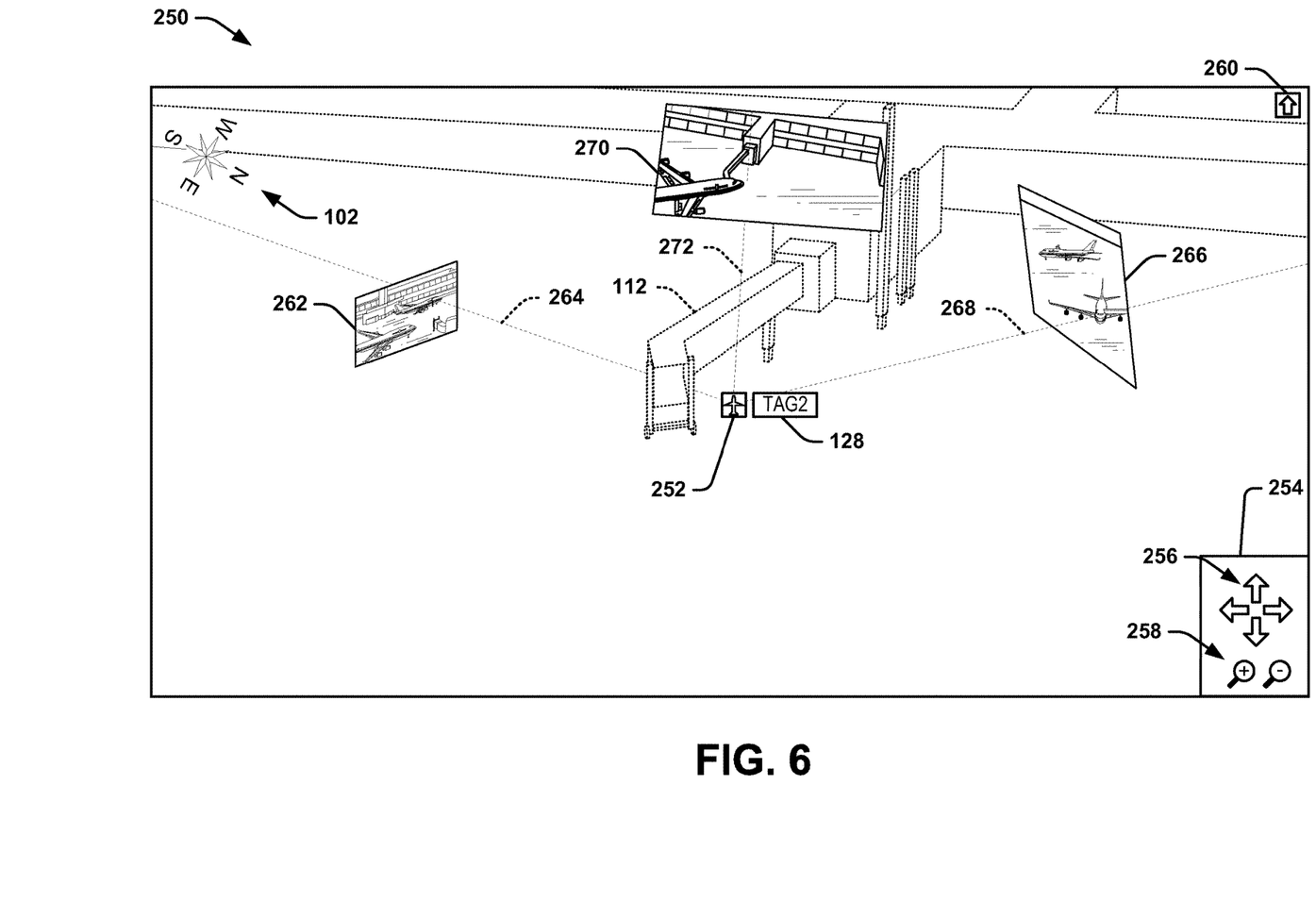
FIG. 6 illustrates a fourth example of image data.

FIG. 6 illustrates a fourth example of image data 250. The image data 250 is demonstrated in the dynamic object-centric view corresponding to a dynamic object 252 that corresponds to the dynamic object icon 126 associated with TAG2 in the examples of FIGS. 3-5. For example, the user can select the dynamic object icon 252 (e.g., via a single-click or a double-click) to switch from the overhead view demonstrated in the image data 100 and 150 in the respective examples of FIGS. 3 and 4 or the camera-perspective view demonstrated in the image data 200 in the example of FIG. 5 to select the dynamic object-centric view corresponding to the dynamic object icon 252. Therefore, in the example of FIG. 6, the dynamic object icon 252 is substantially centered in the display 64, such that the location perspective of the user is centered upon the dynamic object 252. The virtual location of the user can thus be offset from the dynamic object 252 by a given distance that can be predetermined and/or can have a default value, and the viewing perspective of the user with respect to the virtual environment 58 can be based on the virtual location of the user relative to the virtual location of the dynamic object icon 252 in the virtual environment 58.

The image data 250 includes a set of controls 254 that are different from the sets of controls 104 in the examples of FIGS. 3 and 4, and can thus allow the user to manipulate the image data 250 in a different manner relative to the image data 100 and 150 in the respective examples of FIGS. 3 and 4 or the camera-perspective view demonstrated in the image data 200 in the example of FIG. 5. For example, the set of controls 254 can correspond to changing the virtual location of the user relative to the virtual location of the dynamic object 252 in the virtual environment 58. In the example of FIG. 6, the set of controls 254 includes a set of direction arrows 206 to allow the user to change the orientation angle (e.g., azimuth and polar angles in a spherical coordinate system) of the virtual location of the user relative to the dynamic object icon 252 in the virtual environment 58 in the dynamic object-centric view. In response to changes in the orientation of the virtual location of the user relative to the dynamic object icon 252, the location perspective of the user remains substantially centered upon the dynamic object icon 252 in the dynamic object-centric view in the example of FIG. 6. Additionally, the set of controls 254 also includes zoom controls 258 to change the offset distance of the virtual location of the user relative to the dynamic object icon 252 in the virtual environment 58 along the axis defined by the orientation angle of the virtual location of the user relative to the dynamic object icon 252 in the dynamic object-centric view. Furthermore, the image data 250 includes an icon 260 that the user can select to switch to the overhead view, such as demonstrated in the examples of FIG. 3 or 4.

In the example of FIG. 6, the real-time video images of the cameras 52 having a perspective view of the dynamic object associated with the dynamic object icon 252 are demonstrated as superimposed on the virtual environment 58 at a location and orientation that correspond to the location perspective of the user. In the example of FIG. 6, a first real-time video image 262 is demonstrated at a location along an axis 264 that connects the respective camera 52 corresponding to the camera icon 116 at a focal plane of the respective camera 52. Similarly, a second real-time video image 266 is demonstrated at a location along an axis 268 that connects the respective camera 52 corresponding to the camera icon 118 at a focal plane of the respective camera 52, and a third real-time video image 270 is demonstrated at a location along an axis 272 that connects the respective camera 52 corresponding to the camera icon 120 at a focal plane of the respective camera 52.

Because the real-time video images 262, 266, and 270 are superimposed at locations and orientations that correspond to the location perspective of the user in the virtual environment 58, the real-time video images 262, 266, and 270 are displayed in a manner that simulates the manner that the user would see the associated visual content of the real-time video images 262, 266, and 270 as perceived from the actual location in the actual geographic region corresponding to the virtual location in the virtual environment 58. Therefore, as the user changes location perspective in the dynamic object-centric view via the set of controls 254, the location and orientation of the real-time video images 262, 266, and 270 likewise change accordingly to maintain the simulated view that the user would see the associated visual content of the real-time video images 262, 266, and 270 as perceived from the actual location in the actual geographic region corresponding to the virtual location in the virtual environment 58.

Similar to as described previously, the variable resolution controller 66 can be configured to provide the real-time video images 262, 266, and 270 at a resolution that corresponds to the relative virtual proximity and orientation angle of the real-time video images 262, 266, and 270 relative to the location perspective of the user in the virtual environment 58. As an example, the real-time video data stream 270 can have a greater resolution than each of the real-time video images 262 and 266 based on being closer to the location perspective of the user in the virtual environment 58 and based on having an orientation relative to the location perspective that is more on-axis with respect to the axis 272. The variable resolution controller 66 can thus change the resolution of the respective real-time video images 262, 266, and 270 as the user changes the location perspective in the dynamic object-centric view via the set of controls 254 based on changes in the distance and orientation of the respective real-time video images 262, 266, and 270.

Furthermore, the user can interact with the real-time video images 262, 266, and 270, such as to change views from the dynamic object-centric view demonstrated in the example of FIG. 6. For example, the user can select via the user interface 62 one of the real-time video images 262, 266, and 270 to either preview the real-time video images 262, 266, and 270 in a manner substantially similar to as demonstrated in the example of FIG. 4 (e.g., via a single-click), or to switch to a camera-perspective view of the camera 52 associated with the respective one of the real-time video images 262, 266, and 270, such as similar to selection of the one of the camera icons 116, 118, and 120, respectively. As another example, the user can select one of the real-time video images 262, 266, and 270 to be deactivated in the dynamic object-centric view in the example of FIG. 6, such as to conserve processing resources of the image processor 60 and/or to mitigate clutter in the image data 250, such as in the presence of many superimposed real-time video image streams in close proximity (e.g., to focus on a subset of superimposed video image streams). Therefore, the user can implement a number of control options via the user interface 62 in the dynamic object-centric view in the example of FIG. 6.

The overhead view in the examples of FIGS. 3 and 4, the camera-perspective view in the example of FIG. 5, and the dynamic object-centric view in the example of FIG. 6 are examples of the manner in which the user can navigate and interact with the virtual environment 58 and monitor the real-time video streams superimposed thereon. Other examples of navigating through the virtual environment 58 are possible, such as to select from predetermined location perspectives and/or in a virtual flight-mode to provide the location perspective to the user from any virtual location in three-dimensional space in the virtual environment 58.

Figure 7:
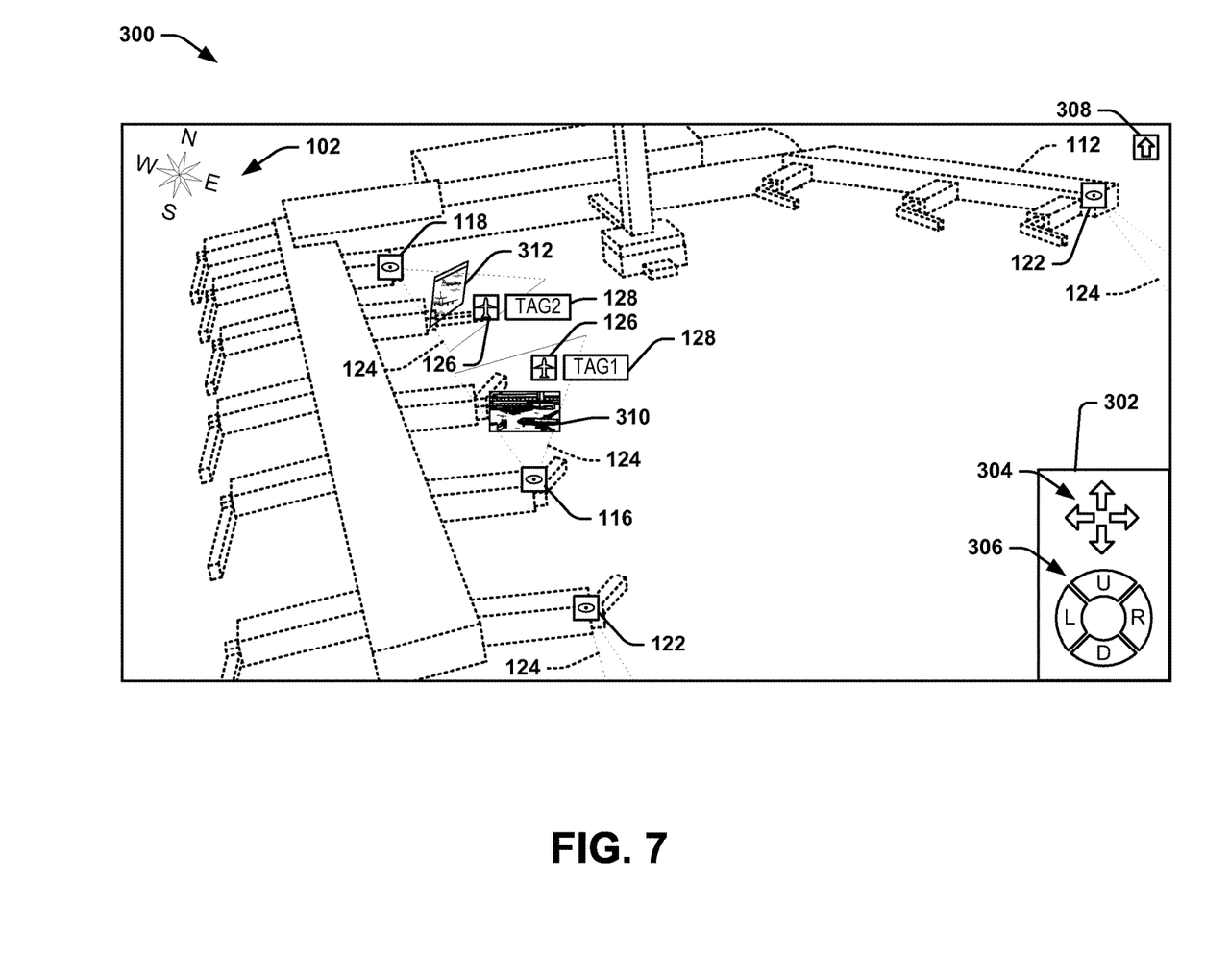
FIG. 7 illustrates a fifth example of image data.

FIG. 7 illustrates a fifth example of image data 300. The image data 300 is demonstrated in a flight-mode view, such that the user can manually navigate through the virtual environment 58 to provide a location perspective that can be in any virtual location in three-dimensional space in the virtual environment 58. The image data 300 includes a set of controls 302 that allow the user to manipulate the image data 300 in a different manner relative to the sets of controls 104 in the examples of FIGS. 3 and 4, the set of controls 204 in the example of FIG. 5, and the set of controls 254 in the example of FIG. 6. For example, the set of controls 302 includes a set of direction arrows 304 to allow the user to move in three-dimensional space (e.g., forward, backward, left, and right), and yaw and pitch directional controls 306 to allow the user to change the viewing perspective of the user in the virtual environment 58. Therefore, the user can move to substantially any virtual location in three-dimensional space in the virtual environment 58 to simulate being located in any point in three-dimensional space with respect to the geographic region. Additionally, the set of controls 302 can include additional controls, such as to simulate actual flight. For example, the set of controls 302 can include velocity controls (e.g., iterative timing of forward and/or backward movement) and roll controls. Furthermore, the image data 300 includes an icon 308 that the user can select to switch to the overhead view, such as demonstrated in the examples of FIG. 3 or 4.

Similar to the image data 200 and 250 in the examples of FIGS. 5 and 6, real-time video images obtained via the cameras 52 are superimposed at locations and orientations that correspond to the location perspective of the user in the virtual environment 58. Therefore, the respective real-time video images are displayed in a manner that simulates the manner that the user would see the associated visual content of the real-time video images as perceived from the actual location in the actual geographic region corresponding to the virtual location in the virtual environment 58. In the example of FIG. 7, the image data 300 includes a first real-time video image 310 corresponding to the camera 52 associated with the camera icon 116 and a second real-time video image 312 corresponding to the camera 52 associated with the camera icon 118. Similar to as described previously, the real-time video images 310 and 312 are superimposed at locations and orientations that correspond to the location perspective of the user in the virtual environment 58. Therefore, as the user changes location perspective in the dynamic object-centric view via the set of controls 302, the location and orientation of the real-time video images 310 and 312 likewise change accordingly to maintain the simulated view that the user would see the associated visual content of the real-time video images 310 and 312 as perceived from the actual location in the actual geographic region corresponding to the virtual location in the virtual environment 58.

Thus, as described herein, the area monitoring system 50 provides a manner in which a user can interact with the preprogrammed virtual environment 58 to quickly and easily access real-time video images provided by the plurality of cameras 52 located at disparate locations to monitor separate portions of the geographic region. Because the virtual environment 58 is preprogrammed, the area monitoring system 50 can be implemented in a much more simplistic and less processing-intensive manner than typical area monitoring systems, such as those that implement video draping. For example, area monitoring systems that implement video draping require substantially perfect and up-to-date three-dimensional modeling of the geographic region in order for real-time video images to properly align with the model. Otherwise, the superimposed real-time video images will look distorted and/or smeared in a video draping system.

Therefore, typical area monitoring systems that implement video draping typically implement stereo camera pairs to create the three-dimensional model in real-time and drape the real-time video images of monitoring cameras onto the created three-dimensional model. As a result, such area monitoring systems that implement video draping require substantially more cameras to accurately generate the model and require significant processing power to generate the three-dimensional model and to align the real-time video images correctly. Furthermore, it would be very time consuming and/or memory or processing intensive to be able to obtain the stereo-camera images of all portions of large geographic regions at every orientation angle, making navigation of the model and superimposition of the real-time video images onto the model very difficult to implement. Thus, based on using the preprogrammed virtual environment 58 that is generated at a low resolution and superimposing real-time video images onto the virtual environment 58 at the appropriate orientation angles corresponding to the location perspective of the user, the area monitoring system 50 can be implemented in a simplistic and low processing-intensive manner to provide sufficient area monitoring for a given user.

Figure 8:
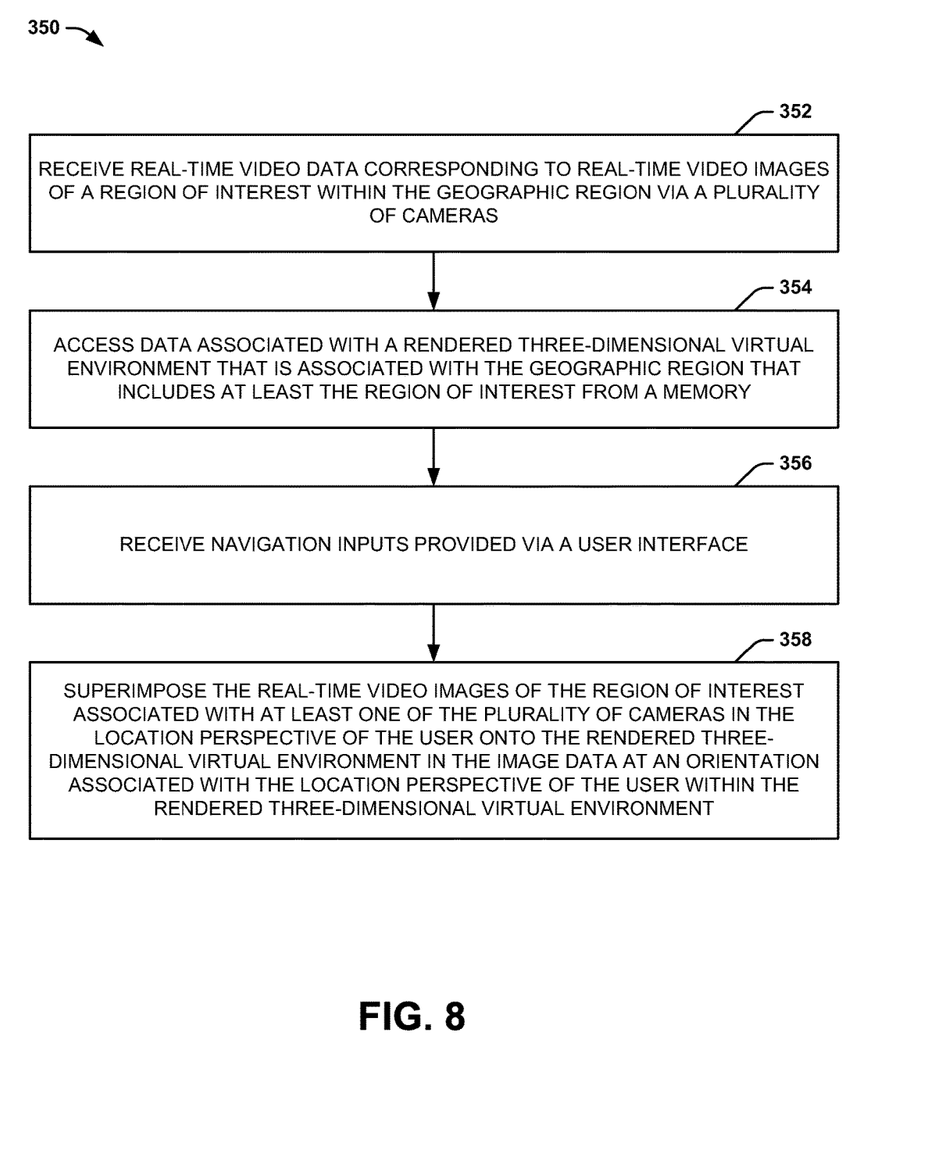
FIG. 8 illustrates an example of a method for switching from a first data stream to a second data stream in a PHY device of a network device.

In view of the foregoing structural and functional features described above, a methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 8 illustrates an example of a method 350 for monitoring a geographic region. At 352, real-time video data (e.g., the real-time video data VID) corresponding to real-time video images (e.g., the real-time video images RTVI) of a region of interest within the geographic region is received via a plurality of cameras (e.g., the cameras 52). At 354, data associated with a rendered three-dimensional virtual environment (e.g., the virtual environment 14) that is associated with the geographic region that includes at least the region of interest is accessed from a memory (e.g., the memory 56). At 356, navigation inputs provided via a user interface (e.g., the user interface 62) are received. The navigation inputs can correspond to virtual movement of a user within the rendered three-dimensional virtual environment and to a location perspective corresponding to a viewing perspective of the user at a given virtual location within the rendered three-dimensional virtual environment. At 358, the real-time video images of the region of interest associated with at least one of the plurality of cameras in the location perspective of the user are superimposed onto the rendered three-dimensional virtual environment in the image data at an orientation associated with the location perspective of the user within the rendered three-dimensional virtual environment.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An area monitoring system comprising:
    at least one camera configured to monitor a region of interest and to provide real-time video data corresponding to real-time video images of the region of interest;
    a memory configured to store data associated with a rendered three-dimensional virtual environment that is associated with a geographic region that includes at least the region of interest;
    an image processor configured to combine the real-time video data and the data associated with the rendered three-dimensional virtual environment to generate image data; and
    a user interface configured to enable a user to navigate the rendered three-dimensional virtual environment via inputs and to display the image data based on a location perspective corresponding to a viewing perspective of the user at a given virtual location within the rendered three-dimensional virtual environment, the image processor being configured to superimpose the real-time video images of the region of interest onto the rendered three-dimensional virtual environment in the image data at a location and an orientation based on the location perspective of the user within the rendered three-dimensional virtual environment, wherein the user interface is further configured to enable the user to view the image data in a dynamic object-centric view associated with the location perspective of the user being offset from and substantially centered upon a dynamic object that is graphically displayed as a dynamic object icon with respect to the rendered three-dimensional virtual environment via the image processor in response to location information associated with the dynamic object.

2. The system of claim 1, wherein the user interface is further configured to enable the user to view the image data in one of an overhead view associated with the location perspective of the user being an overhead perspective with respect to the rendered three-dimensional virtual environment, and a camera-perspective view associated with the location perspective of the user being substantially similar to a perspective of a respective one of the at least one camera superimposed on the rendered three-dimensional virtual environment.

3. The system of claim 2, wherein the user interface is further configured to enable the user to preview the perspective of the respective one of the at least one camera from the overhead view.

4. The system of claim 2, wherein the user interface is further configured to enable the user to select the camera-perspective view by selecting a camera icon via the user interface, the camera icon corresponding to a three-dimensional physical location of the respective one of the at least one camera, the camera icon being superimposed on the rendered three-dimensional virtual environment via the image processor.

5. The system of claim 4, wherein the image data comprises a visual indication of a field of view of the perspective of each of the at least one camera in the overhead view, wherein the visual indication of the field of view emanates from the camera icon of each respective one of the at least one camera.

6. The system of claim 1, wherein the user interface is further configured to enable the user to select the dynamic object-centric view by selecting the dynamic object icon via the user interface, wherein the dynamic object-centric view comprises a perspective angle and offset distance of the location perspective of the user relative to the dynamic object that are each adjustable via the user interface.

7. The system of claim 1, further comprising a dynamic object interface configured to receive at least one dynamic object input associated with a respective dynamic object, the at least one dynamic object input comprising location information associated with the dynamic object, wherein the image processor is configured to superimpose a dynamic object icon in real-time on the rendered three-dimensional virtual environment at a location corresponding to a location of the dynamic object in the geographic region based on the location information.

8. The system of claim 7, wherein the image processor is further configured to superimpose a tag associated with the respective dynamic object onto the image data, the tag comprising descriptive information associated with the respective dynamic object based on the at least one dynamic object input.

9. The system of claim 1, further comprising a video controller configured to receive the real-time video data and to provide the real-time video data to the image processor in response to a request for the real-time video data by the image processor based on the location perspective of the user within the rendered three-dimensional virtual environment.

10. The system of claim 9, wherein the video controller comprises a variable resolution controller configured to provide the real-time video data at a resolution that varies based on at least one of a distance and a viewing perspective angle of the location perspective of the user with respect to a location of the real-time video images superimposed in the rendered three-dimensional virtual environment relative to the location perspective of the user.

11. A non-transitory computer readable medium comprising instructions that, when executed, are configured to implement a method for monitoring a geographic region, the method comprising:
receiving real-time video data corresponding to real-time video images of a region of interest within the geographic region via a plurality of cameras;
accessing data associated with a rendered three-dimensional virtual environment that is associated with the geographic region that includes at least the region of interest from a memory;
receiving navigation inputs provided via a user interface, the navigation inputs corresponding to virtual movement of a user within the rendered three-dimensional virtual environment and to a location perspective corresponding to a viewing perspective of the user at a given virtual location within the rendered three-dimensional virtual environment,
receiving at least one dynamic object input associated with a respective dynamic object, the at least one dynamic object input comprising location information associated with the dynamic object;
superimposing the real-time video images of the region of interest associated with at least one of the plurality of cameras in the location perspective of the user onto the rendered three-dimensional virtual environment in the image data at a location and an orientation based on the location perspective of the user within the rendered three-dimensional virtual environment;
superimposing a dynamic object icon in real-time on the rendered three-dimensional virtual environment at a location corresponding to a location of the dynamic object in the geographic region based on the location information;
implementing the navigation inputs to facilitate selecting the dynamic object icon via the user interface to enable the user to view the image data in a dynamic object-centric view associated with the location perspective of the user being offset from and substantially centered upon the dynamic object icon;
adjusting at least one of a perspective angle and an offset distance associated with the location perspective of the user relative to the dynamic object icon in the dynamic object-centric view to adjust the orientation of the superimposed real-time video images of the region of interest associated with at least one of the plurality of cameras based on the location perspective of the user.

12. The method of claim 11, wherein receiving navigation inputs comprises receiving navigation inputs via the user interface that correspond to a virtual movement of a user in flight through the rendered three-dimensional virtual environment, such that the navigation inputs comprise viewing perspective direction commands and forward, backward, left, and right movement commands.

13. The method of claim 11, wherein receiving navigation inputs comprises:
receiving a first perspective input to enable the user to view the image data in an overhead view associated with the location perspective of the user being an overhead perspective with respect to the rendered three-dimensional virtual environment to enable the user to preview a perspective of a respective one of the plurality of cameras from the overhead view; and
receiving a second perspective input to enable the user to view the image data in a camera-perspective view associated with the real-time video images corresponding to the location perspective being substantially similar to a perspective of a respective one of the at least one camera superimposed on the rendered three-dimensional virtual environment.

14. The method of claim 11, wherein superimposing the real-time video images comprises superimposing the real-time video images at a resolution that varies as a function of the location perspective based on at least one of a distance and a viewing perspective angle of the user at the given virtual location with respect to a relative location of the real-time video images superimposed in the rendered three-dimensional virtual environment.

15. An area monitoring system comprising:
at least one camera configured to monitor a region of interest and to provide real-time video data corresponding to real-time video images of the region of interest;
a memory configured to store data associated with a rendered three-dimensional virtual environment that is associated with a geographic region that includes at least the region of interest;
an image processor configured to combine the real-time video data and the data associated with the rendered three-dimensional virtual environment to generate image data;
a video controller configured to receive the real-time video data and to provide the real-time video data to the image processor in response to a request for the real-time video data by the image processor based on a location perspective corresponding to a viewing perspective of the user at a given virtual location within the rendered three-dimensional virtual environment; and
a user interface configured to enable a user to navigate the rendered three-dimensional virtual environment via inputs and to display the image data based on the location perspective, the image processor being configured to superimpose the real-time video images of the region of interest onto the rendered three-dimensional virtual environment in the image data at a location and an orientation based on the location perspective of the user within the rendered three-dimensional virtual environment and at a resolution that varies based on at least one of a distance and a viewing perspective angle of the user with respect to a location of the real-time video images superimposed in the rendered three-dimensional virtual environment relative to the location perspective of the user, wherein the user interface is further configured to enable the user to view the image data in a dynamic object-centric view associated with the location perspective of the user being offset from and substantially centered upon a dynamic object that is graphically displayed as a dynamic object icon with respect to the rendered three-dimensional virtual environment via the image processor in response to location information associated with the dynamic object.

16. The system of claim 15, further comprising a dynamic object interface configured to receive at least one dynamic object input associated with a respective dynamic object, the at least one dynamic object input comprising location information associated with the dynamic object, wherein the image processor is configured to superimpose a dynamic object icon in real-time on the rendered three-dimensional virtual environment at a location corresponding to a location of the dynamic object in the geographic region based on the location information.

17. The system of claim 15, wherein the user interface is further configured to enable the user to view the image data in at least one of:
- an overhead view associated with the location perspective of the user being an overhead perspective with respect to the rendered three-dimensional virtual environment; and
- a camera-perspective view associated with the real-time video images corresponding to the location perspective of the user being substantially similar to a perspective from a respective one of the at least one camera superimposed on the rendered three-dimensional virtual environment.

* * * * *